Feb. 3, 1959     P. W. THOMPSON     2,872,255
BEARING ARRANGEMENT
Filed July 12, 1957

Inventor:
Paige W. Thompson,
by Robert G. Spiy
His Attorney.

2,872,255
Patented Feb. 3, 1959

2,872,255

BEARING ARRANGEMENT

Paige W. Thompson, Fort Wayne, Ind., assignor to General Electric Company, a corporation of New York Application July 12, 1957, Serial No. 671,446

4 Claims. (Cl. 308—132)

This invention relates to bearing constructions, and more particularly to an improved bearing construction for providing positive lubrication for shafts which are rotatable in either direction.

There are many applications where machines, such as dynamoelectric mchines for instance, are required to have shafts rotatable in either direction. In these cases, the problem arises of assuring positive lubrication for the bearings supporting the rotatable shaft in the simplest and most economical manner possible. The maximum economy and simplicity is represented by the construction used for a single direction of rotation, i. e., the fewer the bearing changes required for the reversible machine, the less increase there will be over the cost of the machine having a single direction of rotation. The simplest known way of achieving the desired end is to leave the general structure of the bearing unchanged from that provided for a single direction of rotation, and to make surface modifications on one of the two engaging movable surfaces of the bearing so that pumping of the lubricant will be provided in the same direction regardless of the direction of rotation. To achieve this goal it is necessary to provide two surface pumping constructions, one for each direction of rotation. It is, further, important that when one of the surface constructions is working to pump lubricant through the bearing the other construction should not have a subtractive effect.

It is, therefore, an object of this invention to provide an improved bearing for a machine rotatable in either direction where one of the relatively movable surfaces is modified to effect pumping in the same direction across the bearing regardless of the direction of rotation.

A further object of the invention is to achieve this goal in such a manner that there will be no tendency for the two individual surface pumping arrangements to tend to be subtractive with respect to each other.

A further object of the invention, in the preferred embodiment thereof, is to provide a construction where the two pumping constructions will actually assist each other.

Further objects and advantages of this invention will become apparent and the invention will be better understood by reference to the following description and the accompanying drawing, and the features of novelty which characterize this invention will be pointed out with particularity in the claims annexed to and forming a part of this specification.

In one aspect, the invention provides in combination a shaft rotatable in either direction, and a bearing therefor. The bearing includes a sleeve member for rotatably supporting the shaft, and a wicking member arranged in contact with the shaft adjacent the sleeve member for supplying lubricant thereto. A pair of oppositely spiralled grooves are formed in either the shaft or the sleeve member, and are arranged to be substantially co-extensive from the wicking member over the axial length to be lubricated. The outer side of each groove, that is, that side of the groove remote from the other groove, forms a substantially continuous smooth surface; however the inner side of each groove is formed by a series of short surfaces which are angularly displaced relative to each other. In this manner the outer side of each groove pumps substantially more effectively than the inner groove.

Figure 1:
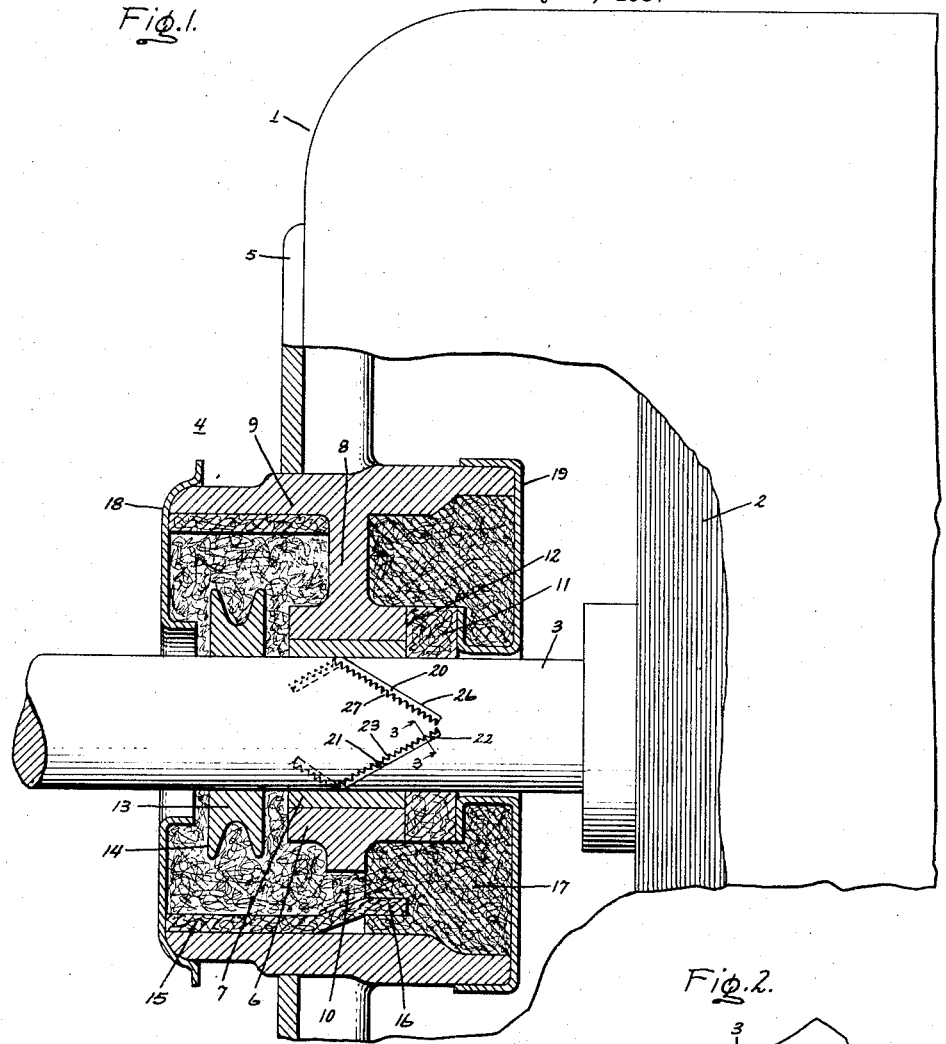
Figure 1 is a fragmentary side view, partly broken away and partly in cross section, of a machine including a preferred embodiment of the improved bearing construction of this invention.

Referring now to the figures of the drawing, there is shown a dynamoelectric machine, generally indicated at 1, having a rotatable rotor member 2 formed in the usual manner from a stacked plurality of thin laminations of magnetic material. A shaft 3 is concentrically secured to rotate with rotor 2, and is rotatably supported by a bearing 4 rigidly secured to housing 5 of machine 1. Bearing 4 includes a sleeve member 6, with a surface 7 of any desired bearing material, supported by a spider 8 extending inwardly from outer part 9 of the bearing. Spider 8 is provided with openings 10. A wicking member 11 is arranged at end 12 of sleeve member 6 in contact therewith and in contact with shaft 3. At the other end of the bearing sleeve 6, secured to the shaft so as to rotate therewith and spaced from the sleeve member, is a lubricant slinger member 13 having peripheral ridges 14. An annulus 15 of resilient absorbent material, such as felt, is arranged against the inner surface of outer part 9 of bearing 4 in alignment with slinger member 13, and is provided with fingers 16 which extend through openings 10 into contact with mass 17 of lubricant absorbent material.

Lubricant fed from wicking member 11 across the surface 7 of sleeve member 6—as will be fully explained herebelow—is thrown outwardly by lubricant slinger member 13 into annulus 15 through centrifugal action when shaft 3 is rotating. The lubricant is then fed back through absorbent members 15 and 17 by capillary action to return to wicking member 11 to repeat the process. Cover members 18 and 19 may be provided at each end of the bearing 4 to maintain the absorbent parts in position and to prevent the escape of lubricant.

Figure 2:
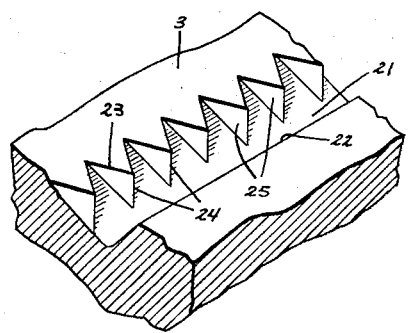
Figure 2 is an enlarged view of a portion of Figure 1.

A pair of substantially co-extensive oppositely spiralled grooves 20 and 21 are formed on one of the relatively moving surfaces, preferably the surface of shaft 3, so as to extend from wicking member 11 substantially across the length of sleeve member 7. Each of the grooves has an outer side, remote from the groove at the wick end, and an inner side, toward the other groove at the wick end. In each case, the outer sides 26 and 22 of grooves 20 and 21 respectively are substantially continuous and smooth. The inner sides 27 and 23 of grooves 20 and 21 respectively are, on the other hand, made up of a series of short surfaces which are angularly displaced with respect to each other. In the preferred embodiment shown, and as appears most clearly in Figure 2, this is achieved by providing the inner side of the groove with a substantially saw-toothed shape made of a series of alternate surfaces 24 and 25. Surfaces 24 are substantially perpendicular to the axis of rotation of machine 1. Each of surfaces 25 actually forms a short portion of a spiral which is opposite in direction to the spiral of the groove of which it forms a part. Thus, the spiral of surfaces 25 of groove 21 is opposite to that of groove 21 as a whole.

Figure 3:
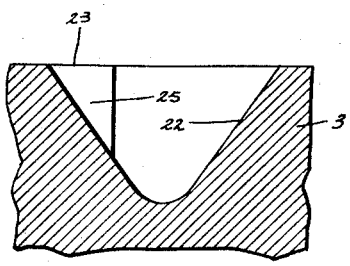
Figure 3 is a view along line 3—3 in Figure 1.

The surface configuration of each of grooves 20 and 21 extends for at least a substantial portion of the depth of the groove, as shown in Figure 3.

The effectiveness of the construction described will now be understood by a brief description of the operation of the invention. If it is assumed that shaft 3 of the machine is rotated in a clockwise direction (as viewed from the left end of Figure 1) then groove 20 has its outer side 26 tending to push whatever lubricant is provided from the wick in a direction perpendicular to its surface. This force can be broken down into two vectors, one perpendicular to the axis of rotation, and the other parallel to the axis of rotation towards the left. As a result, side 26 of groove 20 has the effect of pumping lubricant to the left. During this direction of rotation, inner side 27 of groove 20 and outer side 22 of groove 21 are not operative, but inner side 23 of groove 21 is also facing in the right direction to effect pumping. Surfaces 24 of side 23 are substantially ineffective to achieve any pumping since they are perpendicular to the axis of rotation. However, surfaces 25 tend to provide forces on the lubricant perpendicular to those surfaces. The force vector which is parallel to the axis of rotation extends toward the left and thus, in effect, assists side 26 of groove 20 in pumping lubricant axially across the bearing. Thus, the pumping effect from surfaces 25, while relatively small compared to the pumping effect of side 26, nonetheless helps groove 20 as opposed to previous arrangements where the grooves worked against each other with the amount of lubricant flowing in the desired direction being the differential of the two pumping effects.

It can, of course, be seen that the short surfaces which form sides 23 and 27 may be formed in a variety of ways and that almost any series of short surfaces angularly displaced with respect to each other will preclude a subtractive pumping effect in the groove although they may not, as in the preferred embodiment, provide an additive pumping effect.

When the direction of rotation is reversed the grooves reverse their functions. Side 22 of groove 21 achieves most of the pumping, the short surfaces forming inner side 27 of groove 20 tend to assist it, and sides 23 of grooves 21 and 26 of groove 20 are inoperative.

While the invention has been explained by a particular embodiment thereof, it will be apparent that improvements and modifications may be made without departing from the scope of the invention as defined in the appended claims.

What I claim as new and desire to secure by Letters Patent of the United States is:

1. In combination, a shaft rotatable in either direction, a bearing therefor comprising a sleeve member for rotatably supporting said shaft, and a wicking member arranged in contact with said shaft adjacent said sleeve member for supplying lubricant thereto, one of said shafts and said sleeve members including a pair of oppositely spiralled grooves formed therein co-extending substantially from said wicking member over the axial length to be lubricated, a first side of each said groove remote from the other groove forming a substantially continuous smooth surface, the other side of each said groove adjacent the other groove being formed of a series of short surfaces angularly displaced relative to each other whereby said first side of each said groove effects pumping substantially more effectively than said other side.

2. In combination, a shaft rotatable in either direction, a bearing therefor comprising a sleeve member for rotatably supporting said shaft, and a wicking member arranged in contact with said shaft adjacent said sleeve member for supplying lubricant thereto, said shaft including a pair of oppositely spiralled grooves formed therein co-extending substantially from said wicking member over the axial length to be lubricated, a first side of each said groove remote from the other groove forming a substantially continuous smooth surface, the other side of each said groove adjacent the other groove being formed of a series of short surfaces angularly displaced relative to each other whereby said first side of each said groove effects pumping substantially more effectively than said other side.

3. In combination, a shaft rotatable in either direction, a bearing therefor comprising a sleeve member for rotatably supporting said shaft, and a wicking member arranged in contact with said shaft adjacent said sleeve member for supplying lubricant thereto, said shaft including a pair of oppositely spiralled grooves formed therein co-extending substantially from said wicking member over the axial length to be lubricated, a first side of each said groove remote from the other groove forming a substantially continuous smooth surface, the other side of each said groove adjacent the other groove being formed of a series of short surfaces angularly displaced relative to each other, a substantial portion of said surfaces being formed in a direction spiralling about said shaft oppositely to the direction of spiral of the groove of which said surfaces form a part whereby the other side of each said groove tends to assist the pumping effect of the first side of the opposite groove.

4. The construction of claim 2 wherein alternate short surfaces of said other side of each groove are spiralled oppositely to the groove of which they form a part, and the short surfaces between said alternate short surfaces are formed at angles thereto so as to provide a substantially saw-toothed shape for said other side of each groove.

References Cited in the file of this patent

UNITED STATES PATENTS 2,768,863    Morrill   _____ Oct. 30, 1956

UNITED STATES PATENT OFFICE
CERTIFICATE OF CORRECTION

Patent No. 2,872,255                              February 3, 1959

Paige W. Thompson

It is hereby certified that error appears in the printed specification of the above numbered patent requiring correction and that the said Letters Patent should read as corrected below.

Column 2, line 51, for "the groove" read -- the other groove --.

Signed and sealed this 3rd day of November 1959.

(SEAL)
Attest:
KARL H. AXLINE

Attesting Officer

ROBERT C. WATSON
Commissioner of Patents